US 6,588,554 B2

(12) United States Patent
Fujita et al.

(10) Patent No.: US 6,588,554 B2
(45) Date of Patent: Jul. 8, 2003

(54) VIBRATION DAMPING APPARATUS USING MAGNETIC CIRCUIT

(75) Inventors: Etsunori Fujita, Hiroshima (JP); Yoshimi Enoki, Hiroshima (JP); Hiroki Oshimo, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/006,906

(22) Filed: Nov. 8, 2001

(65) Prior Publication Data

US 2002/0089105 A1 Jul. 11, 2002

(30) Foreign Application Priority Data

Nov. 15, 2000 (JP) ......................................... 2000-348649

(51) Int. Cl.[7] ................................................. F16F 15/03
(52) U.S. Cl. ....................................................... 188/267
(58) Field of Search ................................ 188/267, 266.1, 188/266.3, 266.5, 322.22, 378, 379, 380

(56) References Cited

U.S. PATENT DOCUMENTS

| 4,869,474 A | * | 9/1989 | Best et al. .................... 267/136 |
| 5,120,030 A | * | 6/1992 | Lin et al. ...................... 267/120 |
| 6,105,943 A | * | 8/2000 | Nagasawa ............... 267/140.14 |
| 6,129,185 A | * | 10/2000 | Osterberg et al. ......... 188/267.2 |

FOREIGN PATENT DOCUMENTS

| DE | 391066 A1 | * | 10/1990 |
| JP | 406050374 A | * | 7/1992 |

OTHER PUBLICATIONS

SAE Trans. J. Passenger Cars. 106–6 (1997), 2662–2633.
SAE Trans. J. Passenger Cars, 108–6 (1999), 2893–2908.
DETC2001,VIB–21642 (2001), 650 "An Experimental Study For Collision Stimulus Device Using a Magneto–Spring"; Fujita, E.

* cited by examiner

Primary Examiner—Christopher P. Schwartz
Assistant Examiner—Xuan Lan Nguyen
(74) Attorney, Agent, or Firm—Steinberg & Raskin, P.C.

(57) ABSTRACT

The object of the present invention is to provide a vibration damping apparatus having 6 degrees of freedom using a magnetic circuit. Vibration transfer can be isolated by a vibration damping mechanism to set the spring constant utilizing a relative displacement of a movable magnet 37 to a stationary magnet 27 in an axial direction, and an elastic force of a metal spring 50 substantially to be zero. The displacement is quickly restored to an original position by a rubber 24a and the metal spring 50 composing a device to restore the displacement due to vibration not only in an axial direction (Z axis direction) but also in a horizontal direction (X or Y axis direction), in a rotational direction around each axis, or in a twisting direction which is an overlapping direction of these directions and is damped as a vibration in an axial direction. Accordingly, a vibration having 6 degrees of freedom can be controlled with a simple structure.

7 Claims, 12 Drawing Sheets

VIBRATION DAMPING APPARATUS USING MAGNETIC CIRCUIT

BACKGROUND OF THE INVENTION

The present invention relates to a vibration damping apparatus using a magnetic circuit, and more particularly to a vibration damping apparatus using a magnetic circuit suitable for being used as a component in a vibration damping apparatus, for instance, such as a suspension unit of a vehicle seat, a train seat, or a boat seat, an engine mount, and the like.

A variety of vibration damping materials, vibration dampers, and control techniques have been commonly used to reduce vibration and noise caused by a machine or an apparatus which itself is typically constructed of a low damping material in order to ensure its rigidity.

Damage to human body and its nervous system due to their exposures to vibration has become a serious problem with the ever-increasing vehicle speed. Such a damage shows many symptoms such as fatigue, headache, stiffness of shoulders, lumbago, and amblyopia. In general, vibration isolation is achieved by a damping apparatus with a properly matched spring such as metal springs or air springs and damping materials such as rubber, viscoelastic materials, or dampers. However, the dynamic magnification and the loss factor of the damping apparatus tends to be reversely related to each other. More particularly, a reduction in dynamic magnification to improve low-frequency characteristics of the damping apparatus tends to reduce the loss factor, resulting in the damping apparatus being too firm. An increase in the loss factor of the damping apparatus to improve high-frequency characteristics leads to an increase in its dynamic magnification, resulting in the damping apparatus being too soft and a poor damping efficiency at low-frequency. Many attempts have been made in the prior art to suppress vibration by semi-active control or active control or by using a passive damper containing a dynamic vibration damper.

A vibration damping apparatus containing a magnetic spring device, and having a spring constant being substantially pseudo-zero by incorporating a damping member or an elastic member such as a metal spring, a rubber material, has been recently disclosed. The present inventors have proposed a vibration damping apparatus using a variety of magnetic spring devices, and proposed a device in which a magnetic spring device and a shock absorber are provided together on a common link device to damp the vibration with the magnetic spring device while preventing contact with bottom members and the like by the damping force of the shock absorber for a large displacement accompanied by a large input vibration.

However, when a magnetic spring device and a shock absorber are provided together, the whole apparatus becomes large and a complicated structure. Therefore, it has been long hoped to develop a vibration damping apparatus which realizes both of a vibration damping function by a magnetic spring device and a damping function by a shock absorber in a simple construction so that the total structure can be made small.

On the other hand, the vibration damping devices hitherto proposed are only of one degree of freedom system to control vertical vibration or of 3 degrees of freedom system to be designed to control a horizontal vibration in fore-and-aft direction and right-and-left direction beside the above vertical vibration. A device containing also a shock absorber as described above has only one degree of freedom, and no proposal has been made for a vibration damping device to control the vibration having 6 degrees of freedom, that is, vibrations in X, Y, and Z axes directions in three dimensions and in a rotational direction around each axis in addition to the above directions, and being provided with a viscous damping function at the same time, in a compact design.

SUMMARY OF THE INVENTION

The present invention has been made to overcome the foregoing disadvantage of the prior art, and its object is to provide a vibration damping apparatus having a viscous damping function with a simple structure and making it in a small size. It is another object of the present invention to provide a vibration damping apparatus using a magnetic circuit, which is able to control a vibration having 6 degrees of freedom, to perform a viscous damping function when a large vibration is inputted and to make it in a compact structure.

To attain the aforesaid objects, the inventors first come up with the idea of constructing a magnetic spring device having one degree of freedom using a magnetic circuit which creates a negative spring constant in a predetermined range of the displacement amount in the axial direction and constructing a dash pot system using viscous liquid utilizing the casing of this magnetic spring device. The inventors also come up with the idea that by disposing a restoration device to restore a movable member to its original position from a displacement position in X and Y axis directions, that is, from a displacement position in other directions including a rotational direction, and an elastic member having a positive spring constant and enabling a combined spring constant in a predetermined range of the displacement amount to set to be substantially pseud-zero together with the above-described magnetic spring device, a vibration having 6 degrees of freedom can be controlled with a vibration damping apparatus thus structured in a compact structure.

That is, in a preferred embodiment of the present invention, a vibration damping apparatus using a magnetic circuit is provided. The vibration damping apparatus comprises:

a movable member disposed relatively movable along the axial direction in respect to a casing;

a movable magnet fixed on the movable member;

a stationary magnet fixedly disposed in the above casing, and forming a magnetic field to have a negative spring constant in a predetermined range of the displacement amount in the axial direction of the movable member with the movable magnet;

an elastic member to force the movable member in a direction to keep a distance away from the bottom wall of the casing, and to set a spring constant obtained by combining a magnetic force of a magnetic field formed by the movable magnet and the stationary magnet, and the elastic force to be substantially zero in a predetermined range of the displacement amount in the axial direction; and a piston which moves by being pressed with the movable member and presses a viscous liquid filled in the casing to create fluid resistance when the displacement amount of the movable member in the axial direction reaches a predetermined value.

In a preferred embodiment of the present invention, a vibration damping apparatus using a magnetic circuit further comprises a restoration device to restore the movable member to the original position from the displacement position in other directions including a rotational directions other than the axial directions.

In a preferred embodiment of the present invention, the piston comprises a ring shaped net of a predetermined thickness, in which the outer peripheral face has an outside diameter possible to come in slidable contact with the inner peripheral face of the casing, and a circular shaped plate layered on the top and bottom faces of the net, wherein the net is deformed to to make the mesh smaller by a fluid pressure received by any circular shaped plate, when the movable member moves more than the predetermined amount in the axial direction in respect to the casing, and the mesh functions as an orifice to create fluid resistance.

In a preferred embodiment of the present invention, the net comprises a front mesh layer and a back mesh layer disposed at a predetermined distance, and has a three dimensional structure made by connecting each mesh layer to each other in a manner that a large number of piles are arranged in the opposing direction between the front mesh layer and the back mesh layer.

In a preferred embodiment of the present invention, the restoration device comprises a linkage member which abuts on the circumference of the movable member and displaces its position according to the displacement of the movable member in the other directions, and a rubber member disposed between the linkage member and the casing to allow the movable member to restore to the original position by the elastic restoring force.

In a preferred embodiment of the present invention, the restoration device comprises a linkage member which abuts on the circumference of the movable member and displaces its position according to the displacement of the movable member in the other directions, a first restoring magnet attached on the linkage member, and a second restoring magnet attached on the casing, wherein the first restoring magnet and the second restoring magnet are magnetized in a manner that the first restoring magnet and the second restoring magnet are forced to take positions always opposing to each other by their magnetic forces.

In a preferred embodiment of the present invention, the stationary magnets are disposed in the outside and inside of the movable magnet within the casing.

In a preferred embodiment of the present invention, the elastic member comprises a metal spring.

In a preferred embodiment of the present invention, a vibration damping apparatus using a magnetic circuit further comprises a ring shaped seal member connected to a movable cover fixed around a movable shaft composing the movable member, being able to support the movable cover at a predetermined distance from any of the members composing the casing, and having a function of limiting the movable range of the movable member in a downward direction by abutting on any of the members composing the casing, and a function to prevent leakage of the viscous liquid filled in the casing simultaneously.

In a preferred embodiment of the present invention, a vibration damping apparatus using a magnetic circuit further comprises a ring shaped seal member connected to a movable cover fixed around a movable shaft composing the movable member, being able to support the movable cover at a predetermined distance from any of the members composing the restoration device, and having a function of limiting the movable range of the movable member in a downward direction by abutting on any of the members composing the restoration device, and a function to prevent leakage of the viscous liquid filled in the casing simultaneously.

In a preferred embodiment of the present invention, a vibration damping apparatus using a magnetic circuit comprises a movable member disposed relatively movable along an axial direction in respect to a casing;

an elastic member to force said movable member in a direction to keep a distance away from the bottom wall of said casing;

a piston which moves by being pressed with said movable member and presses a viscous liquid filled in said casing to create fluid resistance when the displacement amount of said movable member in the axial direction reaches a predetermined value; and a magnetic circuit provided on the position opposing to said movable member and said casing, and generating a damping force created by the magnetic induction effect or by the electromagnetic induction effect accompanied by relative movement of said movable member to said casing.

DETAILED DESCRIPTION OF THE PREFERRED EMBODIMENT

Figure 1:
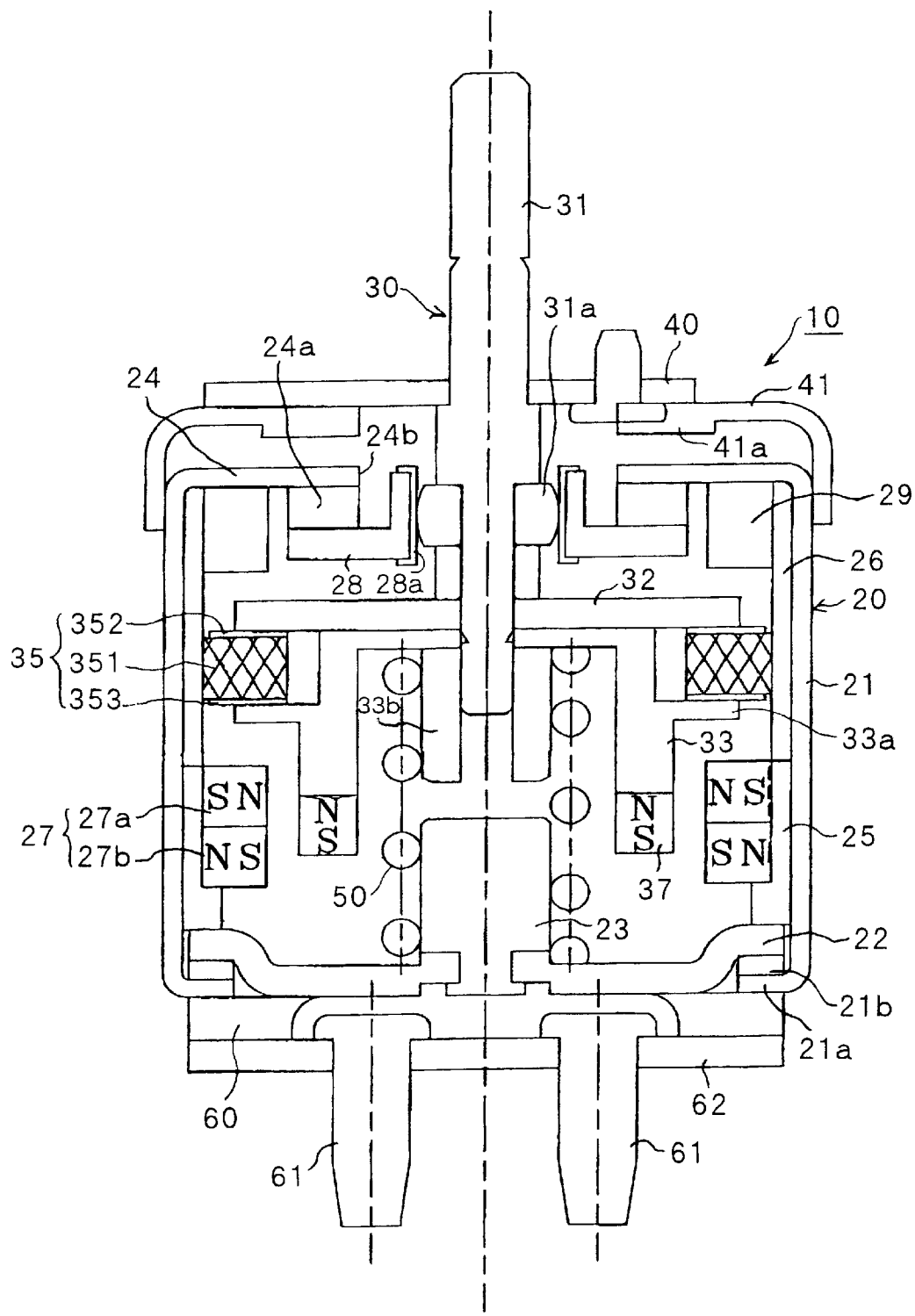
FIG. 1 is a diagrammatic sectional view showing a vibration damping apparatus according to a first embodiment of the present invention.
Figure 2:
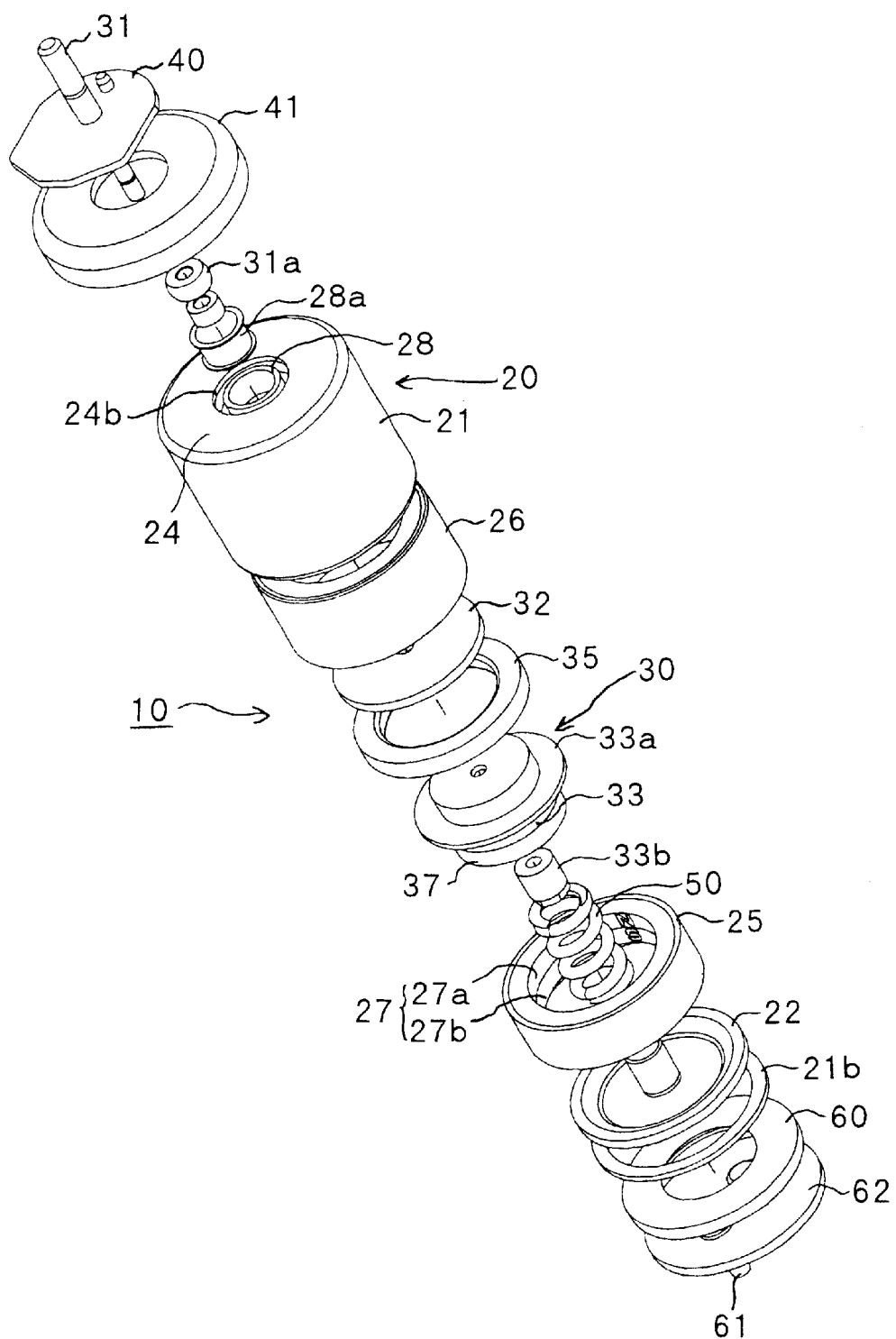
FIG. 2 is an exploded perspective view showing the vibration damping apparatus according to the above first embodiment of the present invention.

Preferred embodiments of the present invention will be explained below in more detail with reference to the drawings. FIG. 1 and FIG. 2 show a vibration damping apparatus 10 according to a first embodiment of the present invention, and FIG. 1 is its sectional view while FIG. 2 is its exploded perspective view.

The vibration damping apparatus 10 comprises a casing 20 and a movable member 30. The casing 20 includes an outer cylinder 21 having a substantially cylindrical shape and a ring shaped bottom wall 22 to close a bottom opening of the outer cylinder 21. A portion to form the bottom opening of the outer cylinder 21 comprises an inward flange 21a protruding inward, and the bottom wall 22 is disposed on the inward flange 21a interposing a packing 21b made of rubber and the like as a seal member therebetween. A bottom side protrusive shaft 23 to support a metal spring 50 which will be described later is protrusively disposed in an opening portion of the ring shaped bottom wall 22. On the top edge of the outer cylinder 21, provided is a ring shaped upper cover 24 protruding inward and having a shaft protrusion hole 24b which is substantially in the center, and is formed to have a diameter larger than that of a movable shaft 31.

Further, the vibration damping apparatus according to the present embodiment is provided with a cylindrical yoke 25 disposed in a manner to be layered on the inside of the outer cylinder 21, and to allow the lower edge of the bottom wall 22 to abut thereon, and an inner cylinder 26 having the same diameter as that of the yoke 25 and disposed between the top edge of the yoke 25 and the ring shaped upper cover 24. The inside face of the inner cylinder 26 serves as a slide contact face with which a piston 35 to be described later comes in slide contact.

A stationary magnet 27 is fixed in the inside of the yoke 25. The stationary magnet 27 is formed in a ring shape, composed of two permanent magnets 27a and 27b which are layered each other and both magnetized in a radial direction. The permanent magnets 27a and 27b are disposed in a manner that the different poles are adjacent in a layered direction (an axial direction) to each other. Incidentally, the stationary magnet 27 is only required to form a magnetic field affecting a movable magnet 37 in the movement direction of the movable member 30, and the shape, the number of magnets to be layered, and the direction to be magnetized and so on are not limited to this example.

The movable member 30 is disposed to be relatively movable with respect to the casing 20 along the axial direction. The movable member 30 includes a movable shaft 31 protruding from the shaft protrusion hole 24b of the ring shaped upper cover 24 toward the outside of the casing 20, and the portion protruding toward the outside of the movable shaft 31 is connected to a flame and the like to support a load mass.

A metal ring 31a, the peripheral face of which is processed to have an arc-shaped cross section is installed in the middle of the movable shaft 31. A ring shaped rubber 24a is fixed on the bottom face of the ring shaped upper cover 24, and a metal linkage member 28 processed substantially in a sectionally L shape in FIG. 1 is fixed on the bottom face of the rubber 24a. A metal abutting plate 28a processed to make frictional resistance small is fixed on the end face of the linkage member 28, which abuts on the outer peripheral face of the ring 31a through the abutting plate 28a. Through this structure, when the movable shaft 31 makes displacement in the horizontal directions (X axis and Y axis directions), in the rotational direction, or in a twisting direction from the shaft center in FIG. 1, the movable shaft 31 can be restored from the displaced position to the shaft center (original position) by the shear stress of the rubber 24a.

On the top of the movable shaft 31, a disk 32 having a smaller diameter than that of the casing 20, and also a magnet holding cylinder member 33 having a movable magnet 37 at the top are provided. The magnet holding cylinder member 33 has a flange 33a protruding to the outer periphery at the middle in the axial direction, and the flange 33a is disposed in a manner that the flange 33a opposes to the disk 32 at a predetermined distance. It should be noted that the outer diameter of the flange 33a is formed to be substantially the same as that of the disk 32 and smaller than that of the casing 20.

The piston 35 is provided in a gap between the disk 32 and the flange 33a. The piston 35 is to create fluid resistance (viscous damping function) by pushing viscous fluid filled in the casing 20, and anything that carries out this function is acceptable. However, when the piston 35 is so designed that it serves its damping effect to the casing 20 if the piston slightly moves relative to the casing, it becomes difficult to damp vibration with a small amplitude of, for instance, 1 mm or less. Therefore, it is preferable for the piston 35 to be structured to function the damping effect when the magnitude of the vibration becomes larger than a predetermined value.

For this reason, in the present embodiment, a piston having a predetermined thickness possible to insert in a gap between the disk 32 and the flange 33a is used as the piston 35, which comprises a ring shaped net 351 of which outer peripheral face has a diameter possible to come in slide contact with the inner peripheral face of the casing 20, a first disk plate 352 disposed between the upper face of the net 351 and the disk 32, and a second disk plate 353 disposed between the lower face of the net 351 and the flange 33a. The first and the second disk plates 352 and 353 are formed to have respective diameters larger than the diameter of the disk 32 and the flange 33a, but smaller than the diameter of the net 351.

Accordingly, when the vibration is small, since the net 351 hardly deforms, and the viscous liquid flows through its mesh, even though the piston 35 moves relative to the casing 20, no liquid resistance is exhibited. However, when the vibration gets in a state more than predetermined, the net 351 deforms to make the mesh smaller in accordance with the magnitude of the pressure applied on the first and second disk plates 352 and 353 to function as an orifice, thereby carrying out the damping capability.

As described above, the outer diameter of the net 351 is larger than those of respective disk plates 352 and 353, and has the size possible to come in slide contact with the inner peripheral face of the casing 20. With this structure, even when the movable shaft 31 moves, for instance, in a twisting direction, the condition of the slide contact with the inner peripheral face of the casing 20 can be maintained, thereby preventing decrease of the damping capability due to a gap created between the net and the inner peripheral face of the casing 20. Besides, all inner diameters of the net 351, and respective disk plates 352 and 353 are formed so as to have a predetermined gap between the outer peripheral face of the magnet holding cylinder 33 provided with the flange 33a and the above-described net and disk plates so that the movement of the movable shaft 31 in the horizontal direction is accepted.

It is preferable for the net 351 composing the piston 35 to have a three-dimensional mesh structure having a predetermined thickness, and, for instance, a three-dimensional structure can be used, which has a front mesh layer and a back mesh layer disposed at a predetermined distance, and a large number of piles are arranged between the front mesh layer and the back mesh layer in the opposing direction so that the mesh layers are connected to each other.

Figure 3:
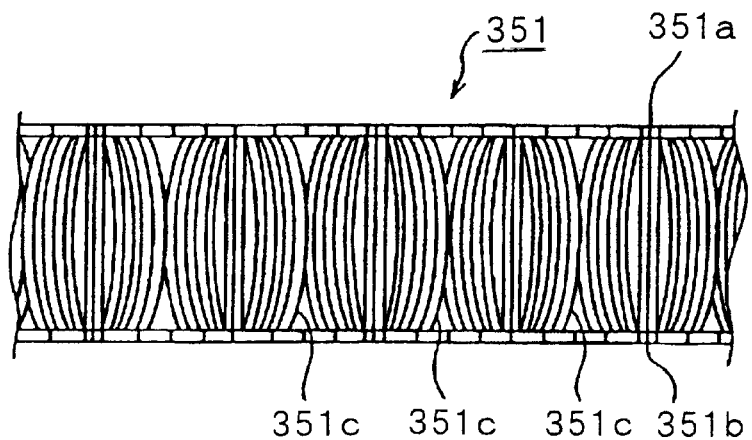
FIG. 3 is a sectional view showing a net used for a piston.
Figure 4:
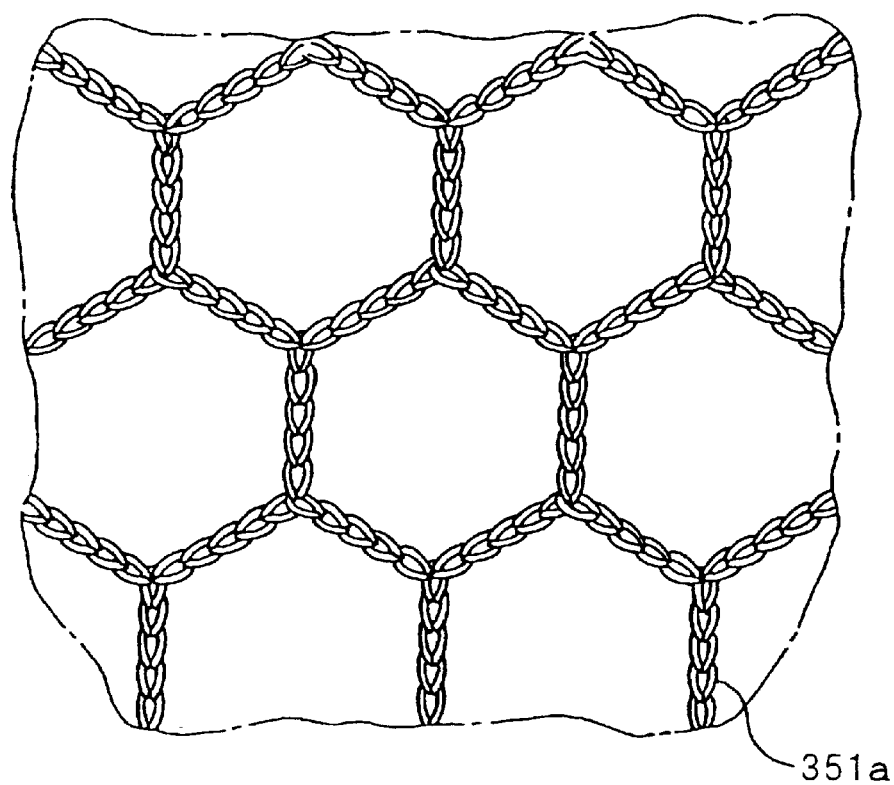
FIG. 4 is a view showing a front mesh layer composing the net.
Figure 5:
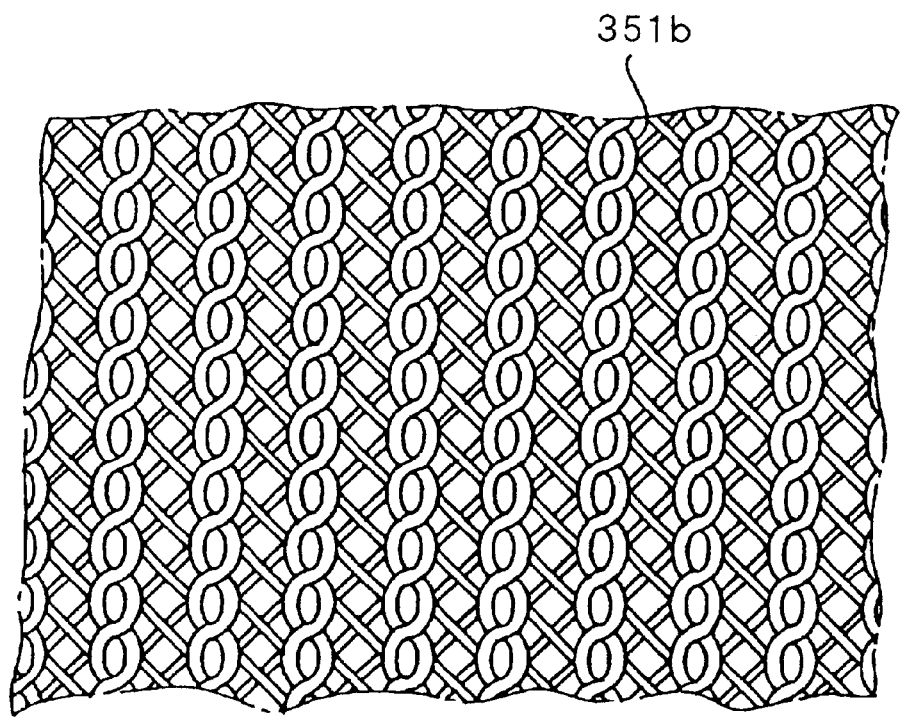
FIG. 5 is a view showing a back mesh layer composing the net.

FIG. 3 shows the structure of the net 351. The front mesh layer 351a is, as shown in FIG. 4, formed in a structure to have a honeycomb shaped (hexagon) mesh made of multifilaments which are made of twisted monofilaments. The back mesh layer 351b is, as shown in FIG. 5, formed in a rib stitch with the multifilaments made of twisted monofilaments to have a structure with a smaller mesh than the honeycomb mesh of the front mesh layer 351a. Piles 351c are formed from the monofilament or the multifilament and stitched between the front mesh layer 351a and the back mesh layer 351b in a manner that the front mesh layer 351a and the back mesh layer 351b keep a predetermined distance, thereby giving the net 351 in a three-dimensional mesh knit a predetermined rigidity. Incidentally, when the word "fiber" is used in the present specification, the meaning includes a spun yarn and the like as well as a monofilament and a multifilament.

Thermoplastic resin is preferable as a fibrous material to form the front mesh layer 351a, the back mesh layer 351b or the piles 351c. The following resins can be used, for instance, thermoplastic polyester resins such as polyethylene terephthalate (PET), polybutylene terephthalate (PBT) and so on, polyamide resins such as nylon 6, nylon 66 and so on, polyolefin resins such as polyethylene, polypropylene and so on, or resin made by mixing two or more kinds of these resins.

The thickness of the fiber forming the piles 351c is, for instance, 380d or more, and preferably, 600d or more. When the fiber having above thickness is used, collapse due to the fall of the piles 351 in a range of small amplitude can be prevented, while in the case of receiving vibration having in a range of the amplitude more than a predetermined magnitude, it functions as an orifice by making the mesh smaller by the fall of the piles 351c.

Several characteristics of the three-dimensional net 351 which can be used for the piston 35 will be shown in Table 1.

In Table 1, "d" indicates "denier" and "1 d" is a unit of thickness when one gram of a fiber material is pulled to 9,000 m. For example, "220 d" means that the fiber has the thickness obtained by pulling one gram of the fiber to 9,000/220=40.9 m. The letter "f" means "filament" which is a unit for expressing the number of monofilaments. For example, "70 f" means that one piece of multifilaments is composed of 70 pieces of monofilaments. An expression "kg/5 cm" used for tensile strength is the strength against pulling of a test piece with 5 cm in width. An expression "parallel" used for the pile structure means a state that the piles 351c connecting the front mesh layer 351a and the back mesh layer 351b do not cross each other seen from a side, while "cross" means a state that the piles cross each other seen from a side.

The movable magnet 37 is supported by fixing on the bottom end of the magnet holding cylinder 33 with an adhesive. The movable magnet 37 comprises a ring shaped permanent magnet having substantially the same diameter as that of the magnet holding cylinder 33, and is magnetized in the thickness direction in a manner to correspond to the magnetic pole arrangement inside the layered permanent magnets 27a and 27b composing the stationary magnet 27 so that the north pole is placed in the upper side and the south pole is placed in the lower side of the movable magnet 37. With this structure, as the relative location between the stationary magnet 27 and the movable magnet 37 changes, the function of the attractive force becomes large or the function of the repulsive force becomes large. Thus, according to the relatively positional relation between the stationary magnet 27 and the movable magnet 37, a kinetic spring constant of a magnetic spring comprised of both magnets varies.

Figure 6:
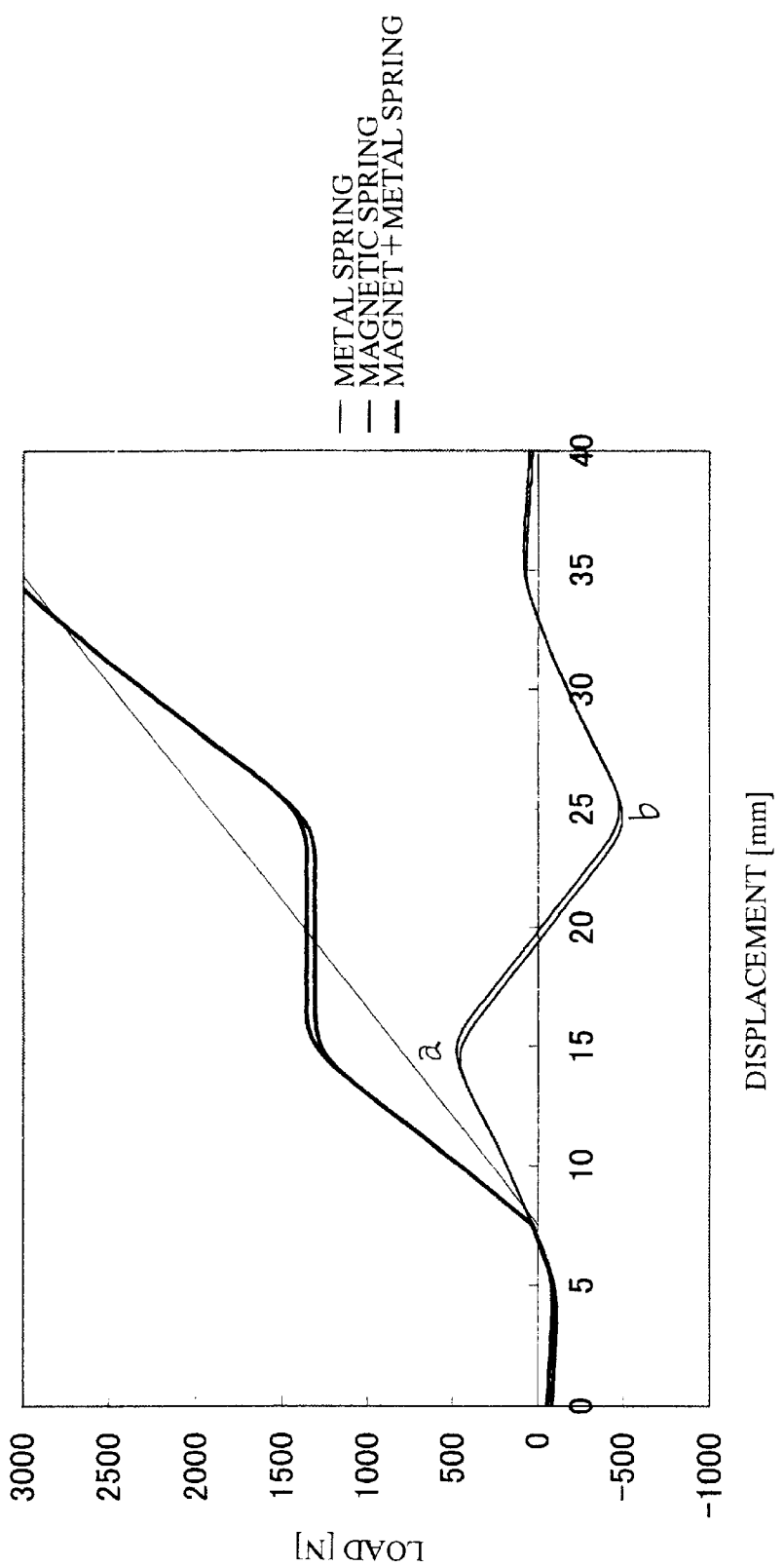
FIG. 6 is a view showing load-displacement characteristics of the vibration damping apparatus according to the first embodiment of the present invention.

FIG. 6 is a view showing the load against displacement characteristics when the movable magnet 37 is displaced from upper side toward down side with a stroke of 40 mm in relation to the stationary magnet 27 having the same structure as is shown in FIG. 1 and FIG. 2. In FIG. 6, a positive value of the load indicates a repulsive force between the stationary magnet 27 and the movable magnet 37, and a negative value indicates an attractive force between the

TABLE 1

| NUMBER | | 1 | 2 | 3 | 4 | 5 | 6 |
|---|---|---|---|---|---|---|---|
| MATERIAL | | NYLON | POLYESTER | ← | ← | ← | ← |
| WEIGHT (g/m²) | | 888 | 784 | 864 | 984 | 876 | 1128 |
| DENSITY | LONGITUDINAL PIECE/inch | 8.0 | 7.5 | ← | 8.5 | 7.0 | 8.5 |
| | LATERAL PIECE/inch | 14.0 | 13.0 | ← | ← | 14.0 | 13.0 |
| THICKNESS | FRONT FACE | 220d/1f | 1300d/96f | ← | ← | ← | ← |
| OF FIBER | BACK FACE | | 500d/70f | ← | ← | ← | ← |
| | PILE | 880d/1f | 600d/1f | ← | ← | 800d/1f | ← |
| TENSILE | LONGITUDINAL | 38.0 | 156.9 | 158.4 | 152.1 | 148.7 | 159.3 |
| STRENGTH (kg/5 cm) | LATERAL | 24.8 | 62.1 | 79.4 | 136.5 | 57.5 | 130.1 |
| ELONGATION | LONGITUDINAL | 111.1 | 56.2 | 62.5 | 48.3 | 50.1 | 50.2 |
| (%) | LATERAL | 189.3 | 66.4 | 68.2 | 43.3 | 78.0 | 40.0 |
| TEAR | LONGITUDINAL | 33.8 | 87.9 | 79.2 | 75.0 | 91.1 | 77.7 |
| STRENGTH (kg) | LATERAL | 26.2 | 49.2 | 44.9 | 63.7 | 41.1 | 66.7 |
| DISTORTION PATIO BY | LONGITUDINAL | — | 2.6 | ← | 2.7 | 1.4 | 1.2 |
| REPEATED LOADING | LATERAL | — | 10.6 | 2.7 | 5.6 | 4.6 | 0.2 |
| ABRASION | LONGITUDINAL | — | 4.5 | ← | ← | ← | ← |
| RESISTANCE | LATERAL | — | 4.0 | ← | 4.5 | ← | ← |
| MESH LAYER STRUCTURE | FRONT | MESH | HONEY COMB | ← | MESH | HONEY COMB | MESH |
| | BACK | MESH | FINE MESH | ← | FINE MESH | FINE MESH | FINE MESH |
| PILE STRUCTURE | | PARALLEL | CROSS | PARALLEL | CROSS | PARALLEL | CROSS | stationary magnet 27 and the movable magnet 37. The position of the displacement 20 mm is, as shown in FIG. 1, a position where the movable magnet 37 confronts the stationary magnet substantially at the middle in the axial direction of the stationary magnet 27.

As is clear from the drawing, as the movable magnet 37 comes close to the stationary magnet 27, the repulsive force becomes greater little by little, and the spring constant shown as an incline of the variation curve shows a positive value till the point a of about 15 mm in displacement, where is maximum in repulsive force, however, the spring constant shows a negative value from the point a to the point b which is about 25 mm in displacement, where is maximum in attractive force. On the other hand, a metal spring 50 to be described later, which is an elastic member, shows a linear spring constant, as shown in FIG. 6. Therefore, in a magnetic spring device composed of the stationary magnet 27 and the movable magnet 37, by positioning the movable magnet 37 at a place where the range showing a negative spring constant is applicable, and by using the metal spring 50 having a positive spring constant with substantially the same in absolute value, a spring constant obtained by combining with each other is substantially zero, as shown in FIG. 6, in the range approximately between 15 mm and 25 mm in displacement. In order to make good use of substantially zero range of the spring constant, it is preferable, in a condition that the load mass is connected and supported with the movable shaft 31, to initialize the movable magnet 37 to confront the stationary magnet in the axial direction of the stationary magnet 27 substantially at the center thereof, which corresponds to a position of about 20 mm of displacement shown in FIG. 6.

An upward stopper 29 which is formed in such a size that the bottom face thereof stretches more downward than the mounting position of the linkage member 28 is disposed in the vicinity of the border between the ring shaped upper cover 24 and the inner cylinder 26 of the casing 20. The upward stopper 29 is made of rubber, plastic or the like, and by abutting the disk 32 on the upward stopper 29, when the movable member 30 vibrates upward considerably in relation to the casing 20, the range of the upward movement of the movable member 30 is limited.

A movable cover 40 is fixed on the outer peripheral face of the movable shaft 31 by welding and the like on the upper position than the ring 31*a* in the movable shaft 31. Besides, there is provided a ring shaped seal member 41 made of rubber and the like. The inner periphery of the seal member 41 is fixed on the bottom face of the movable cover 40 and the outer periphery is fixed on the outer peripheral face of the outer cylinder 21 of the casing 20. The ring shaped seal member 41 serves to prevent leakage of the viscous liquid filled in the casing 20, and in the vicinity of the inner periphery, a wall thickness portion 41*a* thicker than other portions is formed. Since the movable cover 40 fixed on the movable shaft 31 is connected to the casing 20 through the ring shaped seal member 41 made of rubber and the like, it moves vertically together with the movement of the movable shaft 31. Accordingly, when the movable shaft 31 makes a large downward vibration relative to the casing 20, the wall thickness portion 41*a* of the ring shaped seal member 41 comes to abut on the upper face of the ring shaped upper cover 24 of the casing 20, so that it carries out the function preventing from contacting with the bottom members by controlling the range of the downward movement of the movable member 30. When the movable shaft 31 displaces in a rotational direction (twisting direction), the ring shaped seal member 41 connected to the movable shaft 31 through the movable cover 40 serves the function to restore it from the displaced position to the original position taking advantage of its elastic force.

In the present embodiment, the metal spring 50 comprises a coil spring to force the movable member 30 to keep away from the bottom wall 22 of the casing 20, and is disposed between the bottom side protrusive shaft 23 supported by the bottom wall 22 and a supporting shaft 33*b* protruding downward in the drawing from the top end face of the magnet holding cylinder 33. It is needless to say that the disposed position of the metal spring 50 is not limited to this, but it is also acceptable to dispose the metal spring 50 on the outer periphery of the casing 20 as in the case of a second embodiment to be described later.

Besides, in the present embodiment, as shown in FIG. 1 and FIG. 2*a* mounting plate 62 protrusively disposing mounting bolts 61 to fix on a car body frame and the like is provided on the bottom face of the bottom wall 22 of the casing 20 after laminating a ring shaped supplementary rubber 60 thereon. This is for convenience of the mounting operation, and the supplementary rubber 60 between the bottom wall 22 and the mounting plate 62 carries out a function to restore the movable member 30 to the shaft center position by the shear stress, working together with the rubber 24*a* placed around the axle of the above-described movable shaft 31, when the movable member 30 moves in a horizontal direction or a twisting direction in FIG. 1. It is particularly provided as a supplement to restore the movable member 30 to the original position quickly, even when the displacement of the movable member 30 in a horizontal direction is large.

According to the vibration damping apparatus 10 of the present embodiment, when an input vibration is in a range of the amplitude range less than a predetermined value, transfer of the input vibration can be blocked, because, as shown in FIG. 6, a spring constant obtained by combining the magnetic spring device composed of the stationary magnet 27 and the movable magnet 37, with the metal spring 50 as an elastic member, is substantially zero. At this time, since the mesh of the net 351 composing the piston 35 is hardly collapsed, it does not serve as an orifice, and the viscous liquid is not compressed. In a range of slight vibration, when a dash pot system comprising the piston 35, the casing 20 and the viscous liquid is at work, the vibration damping mechanism to set the spring constant which utilizes a relative displacement between the stationary magnet 27 and the movable magnet 37 accompanied by the input vibration, and the elastic force of the metal spring 50 to be zero, does not function. However, according to the present embodiment, since the mesh of the net 351 does not serve as an orifice provided that it is deformed more than a predetermined value by receiving the fluid pressure, the vibration damping function due to the magnetic spring device can be effectively utilized.

On the other hand, when a big input with a large amplitude is applied, since the net 351 composing the piston 35 is collapsed and the mesh becomes small, the mesh serves as an orifice to create fluid resistance, to absorb the impact and to restraint from contacting the bottom members.

When the movable member 30 including the movable shaft 31 is displaced in a horizontal direction or a twisting direction from the shaft center, since the rubber 24*a* disposed around the top of the casing 20 through the linkage member 28 is deformed in the shearing direction, by the ring 31*a* installed in the movable shaft 31, it restores the movable shaft 31 quickly from the displaced position to the shaft center (original position) by the shear stress. Besides, when the ring shaped seal member 41 and the metal spring 50 are deformed accompanied by the displacement of the movable member 30 in a horizontal direction or a twisting direction from the shaft center, and when the displacement of the movable member 30 in a horizontal direction is large, the above-described supplementary rubber 60 is also deformed, and it serves to restore the movable member 30 including the movable shaft 31 to their original positions by its elastic restoring force.

As a result, when the relative position of the movable member 30 and the casing 20 is varied not only in a vertical direction but also in a horizontal direction and a twisting direction from the shaft center, the relative position of the movable magnet 37 held by the movable member 30 to the stationary magnet 27 held by the casing 20 is restored to the designated position quickly by the above-described member such as the rubber 24a, the ring shaped seal member 41, the metal spring 50 and the supplementary rubber 60 which serve as restoration devices. Accordingly, when the movable member 30 is displaced in any direction including a rotational direction, the vibration can be isolated by the vibration damping mechanism to make the spring constant utilizing a relative displacement of the stationary magnet 27 to the movable magnet 37 in a vertical direction accompanied by an input vibration, and an elastic force of the metal spring 50 substantially zero.

Figure 7:
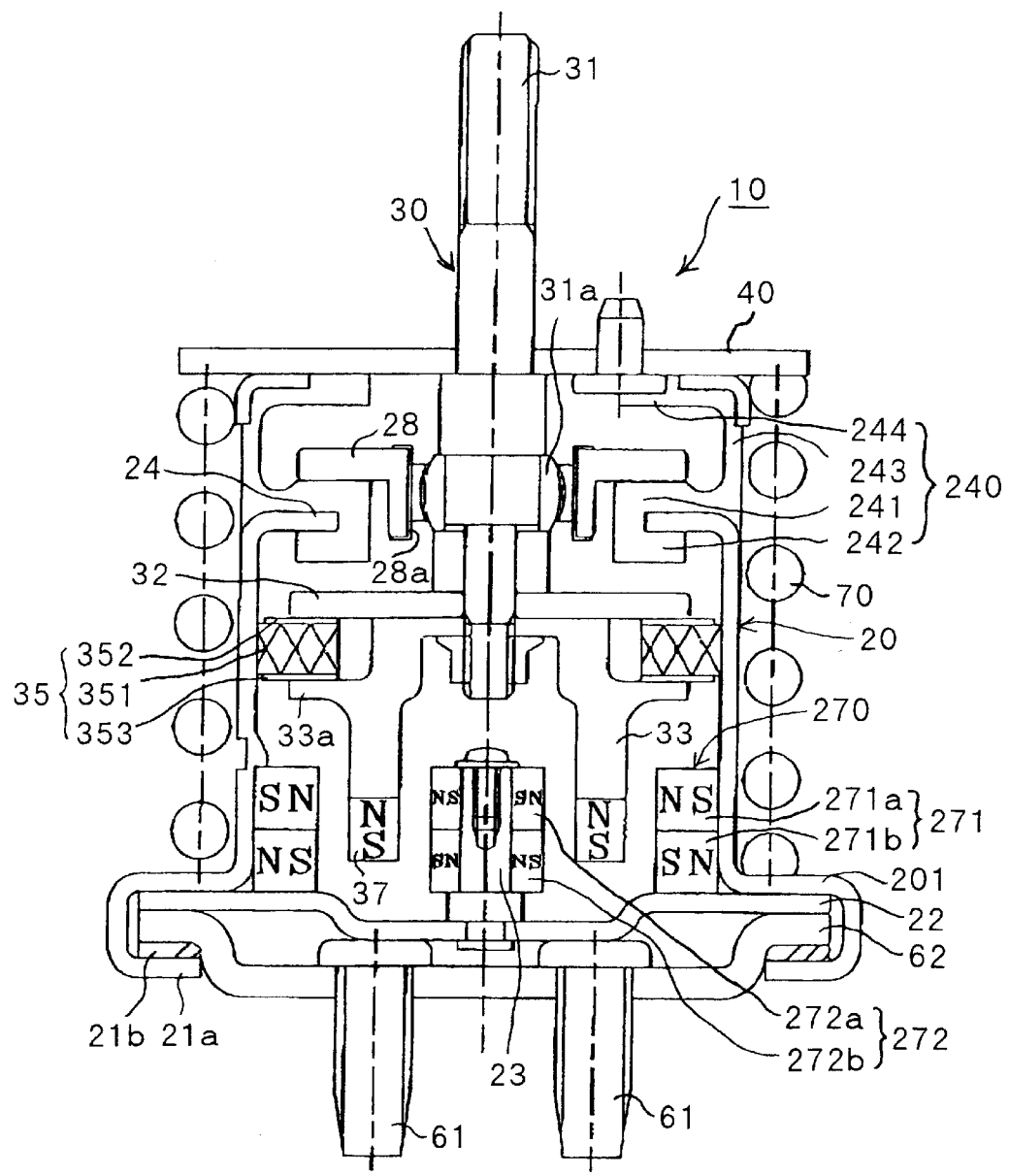
FIG. 7 is a diagrammatic sectional view showing a vibration damping apparatus according to a second embodiment of the present invention.
Figure 8:
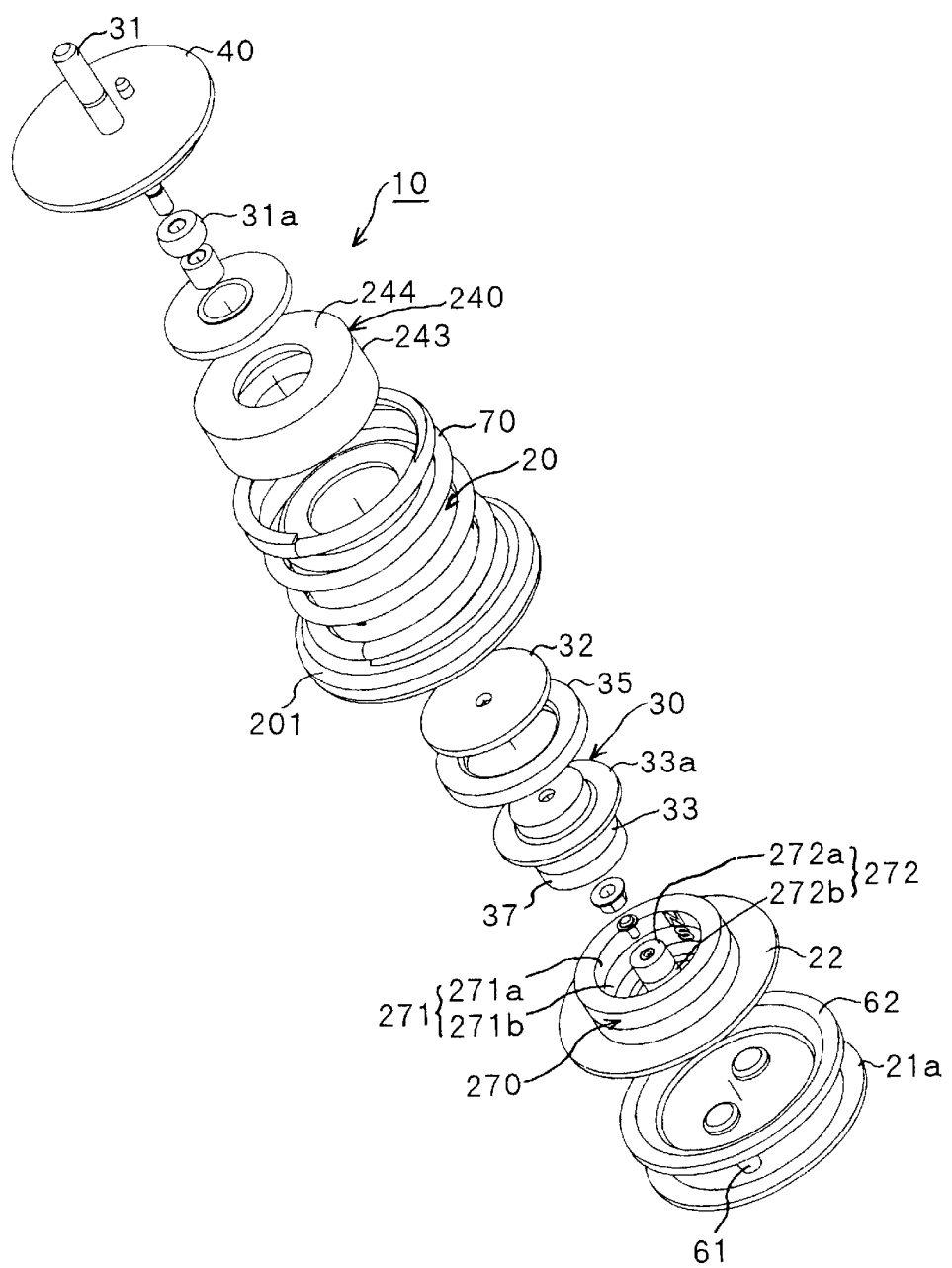
FIG. 8 is an exploded perspective view showing the vibration damping apparatus according to the above second embodiment of the present invention.

FIG. 7 and FIG. 8 show a vibration damping apparatus 10 according to a second embodiment of the present invention. In these drawings, members having the same symbols and numbers as shown in FIG. 1 and FIG. 2 indicate members to serve the same functions as in FIG. 1 and FIG. 2. In the present embodiment, first, a stationary magnet 270 differs from the stationary magnet 27 in the first embodiment on that point that the stationary magnet 270 comprises an outer magnet 271 and an inner magnet 272. The outer magnet 271 is the same as the stationary magnet 27 in the first embodiment, and is formed in a ring shape and fixedly disposed on the inner peripheral face of the casing 20. The outer magnet 271 comprises two ring shaped permanent magnets 271a and 271b layered on each other and the direction of the magnet pole is the same as that of the stationary magnet 27 in the first embodiment. The inner magnet 272 is fixed on the outer periphery of a bottom side protrusive shat 23 disposed substantially in the center of a bottom wall 22. The inner magnet 272 is a layer of two ring shaped permanent magnets 272a and 272b, and fixed on the outer periphery of the bottom side protrusive shaft 23 layered in two vertical tiers. The permanent magnets 272a and 272b are magnetized in the thickness direction, layered in such a direction that the upper permanent magnet and lower permanent magnet attract each other, and, at the same time, disposed in a manner that the north pole of the upper permanent magnet and the south pole of the lower permanent magnet respectively oppose against the movable magnet 37 in accordance with the magnetic pole arrangement of the movable magnet 37.

Thus, in the present embodiment, the stationary magnet 270 is structured including the outer magnet 271 disposed on the outside of the movable magnet 37 and the inner magnet 272 disposed on the inside of the movable magnet 37. The magnetic lines of force are generated from the movable magnet 37 outwardly and inwardly. Since the stationary magnet 27 is disposed only in the outside of the movable magnet 37 in the first embodiment, the utilization efficiency of the magnet lines of force generated inwardly from the movable magnet 37 is poor. On the contrary, according to the present embodiment, since the inner magnet 272 composing the stationary magnet 270 is disposed in the inside of the movable magnet 37, the utilization efficiency of the magnet lines of force generated from the movable magnet 37 can be improved.

In addition, in the present embodiment, a linkage member 28 having the shape of the letter L in cross section, which abuts the peripheral face of a ring 31a installed in the middle of the movable shaft 31 is disposed to place above a ring shaped upper cover 24 of the casing 20. A rubber 240 is disposed between the linkage member 28 and the ring shaped upper cover 24 of the casing 20, and the displacement of the movable shaft 31 in a horizontal direction or in a twisting direction from the shaft center thereof can be corrected by the rubber 240 utilizing its shear stress. The rubber 240 is formed in a ring shape to be able to layer on the upper face of the ring shaped upper cover 24, and comprises: a connecting portion 241 connecting the linkage member 28 and the ring shaped upper cover 24 to exhibit a shear stress; and an upward stopper 242 passing through the inner peripheral edge of the ring shaped upper cover 24 from the connecting portion 241, fixed around the back face of the ring shaped upper cover 24. The upward stopper 242 is abutted by a disk 32 when the disk 32 moves upward by a large vibration. An outer peripheral wall portion 243 standing upward is provided on the outer periphery of the connecting portion 241, and an inwardly protrusive portion 244 bent from the upper portion thereof toward the inside is fixed on the back face of the movable cover 40 fitted on the outer peripheral face of the movable shaft 31 by welding or the like. Since the rubber 240 of the present embodiment includes the outer peripheral wall portion 243 and the inwardly protrusive portion 244 as described above, it performs a function as the ring shaped seal member in the first embodiment, that is a leakage prevention function of the viscous liquid, and a function as a controller for a downward movement range of the movable member 30.

Besides, the movable cover 40 according to the present embodiment is formed to have an outer diameter larger than the diameter of the cylinder portion of the casing 20. The diameters of the bottom wall 22 and the mounting plate 62 of the casing 20 are larger than the diameter of the cylinder portion of the casing 20, and the lower portion of the cylinder portion surrounds and holds the bottom wall 22 and the mounting plate 62 along the outer peripheral edge thereof to form a lower flange 201. Beside, as an elastic member, a metal spring 70 comprising a coil spring is disposed around the outer periphery of the casing 20 between the movable cover 40 and the lower flange 201.

In the case of the vibration damping apparatus of the present embodiment, similar to the case in the first embodiment, since the spring constant obtained by combining the magnetic spring device composed of the stationary magnet 270 and the movable magnet 37 with the metal spring 70 can be set to substantially zero, when an input vibration is within an amplitude range less than a predetermined value, a dash pot system composed of the piston 35, the casing 20, and the viscous liquid does not work, so that the transfer of the input vibration is blocked by this magnetic spring device. When a big input having a large amplitude is applied, the net 351 composing the piston 35 is collapsed, and the mesh becomes small so that the mesh serves as an orifice, thereby the impact is absorbed, and the contacting with the bottom members is restrained due to thus created liquid resistance.

When the movable member 30 including the movable shaft 31 displaces in the direction other than the axial direction, for instance, in a horizontal direction or in a twisting direction from the shaft center, since the connecting portion 241 of the rubber 240 is deformed in a direction of the shear stress through the linkage member 28 by the ring 31a installed in the movable shaft 31, and at the same time, the metal spring 70 is also deformed, the movable member 30 including the movable shaft 31 can be restored to the original position due to the elastic restoring force of these members. As a result, when the movable member 30 is displaced from the shaft center in a horizontal direction or in a twisting direction relative to the casing 20, the movable member 30 is quickly restored in position, and the vibration can be damped by the vibration damping mechanism to set the spring constant to be substantially zero by utilizing relative displacement of the stationary magnet 27 to the movable magnet 37 and an elastic force of the metal spring 70 in the vertical direction.

The outer peripheral wall portion 243 of the rubber 240 is formed between the casing 20 and the movable cover 40, and the outer peripheral wall portion 243 is designed to have the thick portion buckled in a range of the displacement amount in which the spring constant obtained by combining the relative displacement of the stationary magnet 27 and the movable magnet 37 in the vertical direction with the elastic force of the metal spring 70 is substantially zero. As a result, the range of displacement amount having a spring constant of substantially zero can be designed using the relative displacement of the stationary magnet 27 and the movable magnet 37 in the vertical direction, and the elastic force of the metal spring 70 without taking the spring force of the outer peripheral wall portion 243 of the rubber 240 into consideration. However, it is also possible to design in a manner to take advantage of a positive spring constant, not to design in a manner that the outer peripheral wall portion 243 is buckled in a predetermined range of the displacement amount as described above. In such a case, magnitude of a negative spring constant exhibited by the stationary magnet 27 and the movable magnet 37 is adjusted in relation to a positive spring constant by an elastic force obtained by combining the metal spring 70 and the outer peripheral wall portion 243, so as to design in a manner that the spring constant obtained by combining both becomes substantially zero.

When the movable member 30 makes a large upward vibration, the disk 32 abuts on the upward stopper 242 of the rubber 240, so that the range of the upward movement is limited. On the other hand, when the movable member 30 makes a large downward vibration, the inwardly protrusive portion 244 of the rubber 240 fixed on the movable cover 40 abuts on the linkage member 28, so that the range of downward movement is limited.

Figure 9:
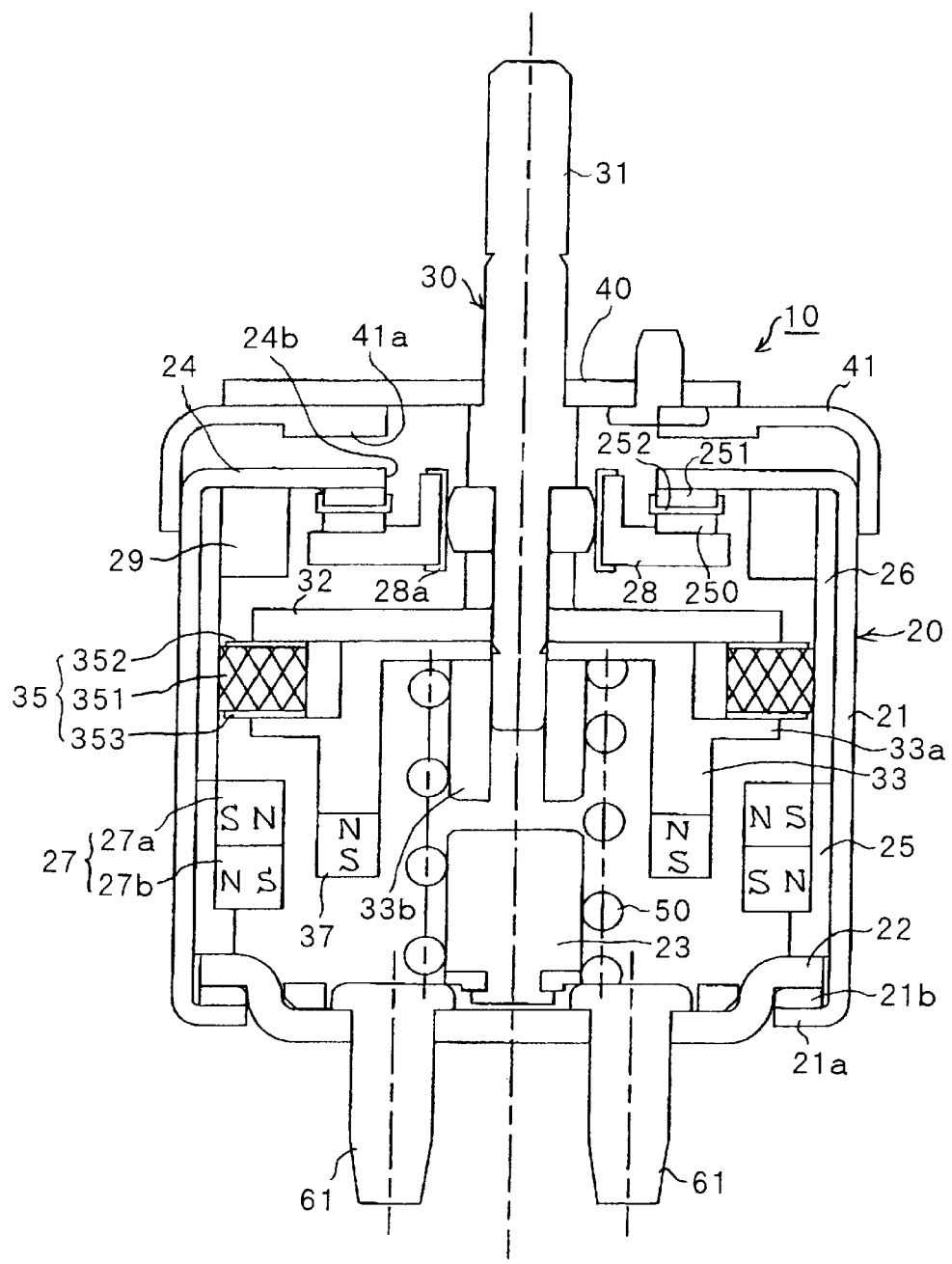
FIG. 9 is a diagrammatic sectional view showing a vibration damping apparatus according to a third embodiment of the present invention.
Figure 10:
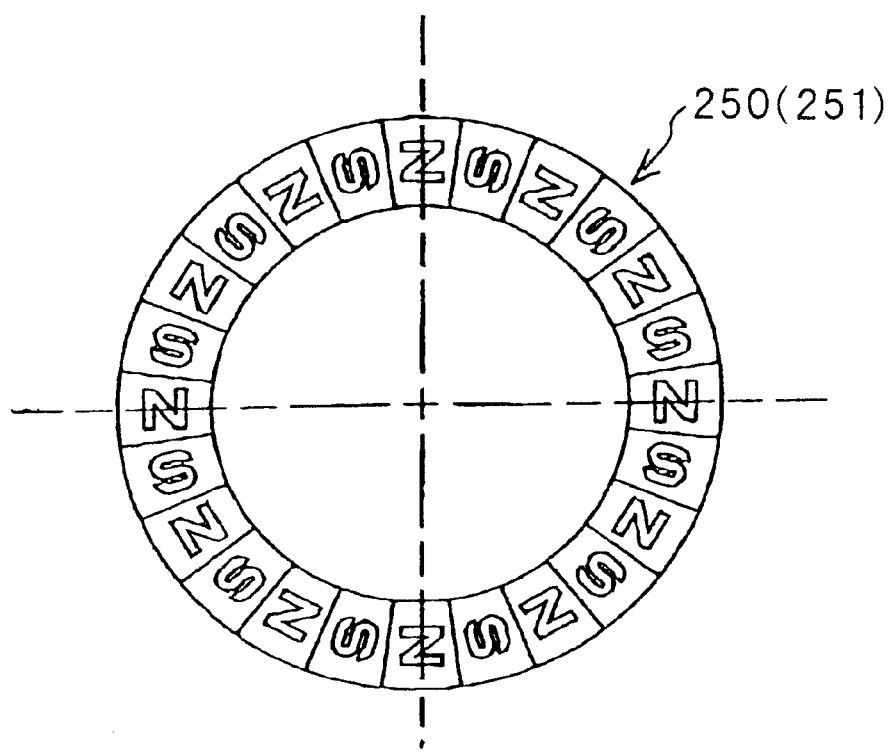
FIG. 10 is a plan view showing a structure of a restoring magnet used in the above third embodiment.
Figure 11:
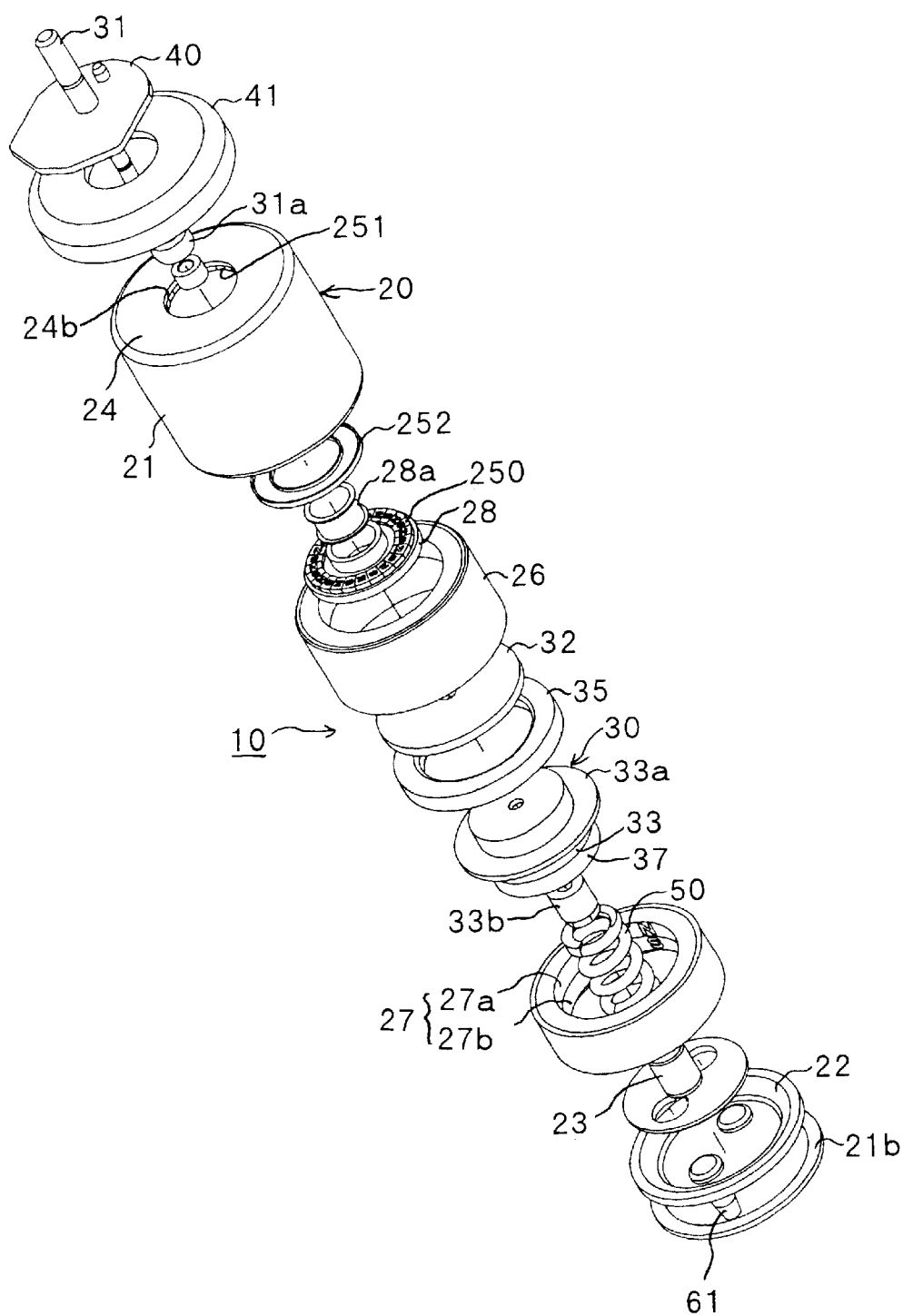
FIG. 11 is an exploded perspective view showing a vibration damping apparatus according to the third embodiment of the present invention.

FIG. 9 through FIG. 11 are views explaining a vibration damping apparatus 10 according to a third embodiment of the present invention. The vibration damping apparatus 10 of the present embodiment has a substantially similar structure to that in the first embodiment, but it differs from that of the first embodiment on that point that a restoring mechanism of the movable member 30 is composed of magnets instead of the rubber 24a of the first embodiment.

That is, the vibration damping apparatus 10 comprises: a first restoring magnet 250 fixed on the upper face of a linkage member 28 which displaces according to the displacement of the movable member 30 in a horizontal direction or the like; and a second restoring magnet 251 fixed on the back face of a ring shaped upper cover 24 of a casing 20. On the opposing face of one restoring magnet in respect to the other restoring magnet, here in the present embodiment, on the opposing face of the second restoring magnet 251 in respect to the face of the first restoring magnet 250, a slide plate 252 made of a non-magnetic material to reduce frictional resistance is layered, and the first restoring magnet 250 slides relative to the slide plate 252 accompanied by the displacement of the movable member 30 in a horizontal direction or the like.

Both the first restoring magnet 250 and the second restoring magnet 251 are formed in a ring shape, and magnetized in a manner that the different magnetic poles are faced to each other under a normal condition, furthermore, in a manner that the first restoring magnet 250 and the second restoring magnet 251 are forced always to stand exactly face to face when the movable member 30 and the casing 20 are relatively displaced. While the first restoring magnet 250 and the second restoring magnet 251 in the present embodiment are formed both in a ring shape, as shown in FIG. 10, a large number of magnets are magnetized in a manner that the north pole and the south pole are alternately disposed along the peripheral direction of the ring and different poles are opposed to each other. Though means for the magnetization is not limited provided that both are always forced to stand exactly face to face each other, it is preferable to form a large number of magnetic poles by magnetizing them as shown in FIG. 10 because restoration to an original position can be attained by an attractive force and a repulsive force in the case of displacement of a movable shaft 31 in a rotational direction by a predetermined amount as well as in the case of displacement of the movable member 30 in a horizontal direction.

The effect of a vibration damping mechanism of setting the spring constant of the magnetic spring device to be substantially zero, and the effect of an impact absorption mechanism by a piston 35 in the vibration damping apparatus 10 of the present embodiment are the same as that described in each embodiment. However, in the present embodiment, the displacement of the movable member 30 in a horizontal direction or in a twisting direction is not restored by the shear stress of the rubber 24a or 240 as in the first embodiment or the second embodiment, but mainly by the effect of the magnetic field formed with the first restoring magnet 250 and the second restoring magnet 251 as described above. Incidentally, a ring shaped seal member 41 serves to restore the displacement in a twisting direction, as in the first embodiment.

Figure 12:
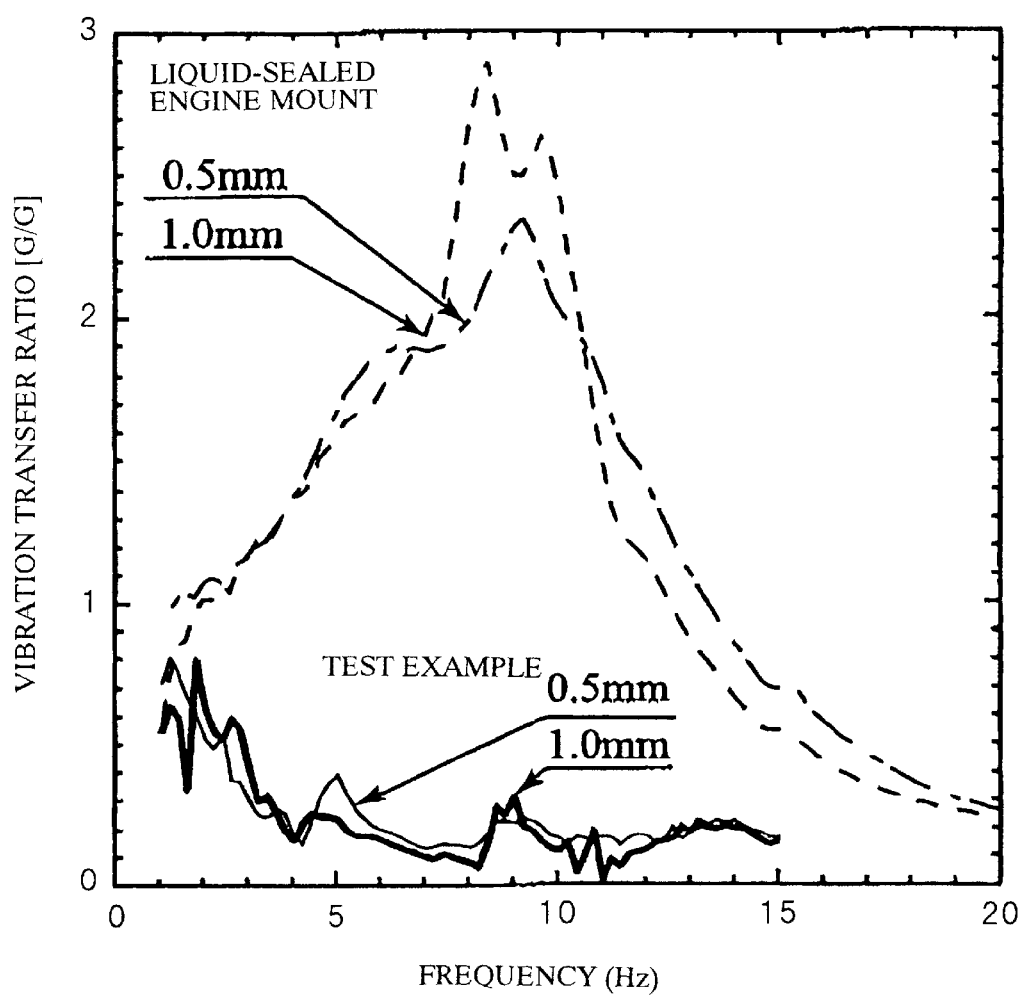
FIG. 12 is a view showing a test result comparing the vibration transfer characteristics of the vibration damping apparatus according to the first embodiment of the present invention and a conventional liquid-sealed engine mount.

FIG. 12 is a view showing the vibration transfer characteristics. The test example shows the data obtained by using the vibration damping apparatus 10 shown in FIG. 1 and FIG. 2. After the first initiation is made in a manner that the position of the movable magnet 37 is substantially in the middle between the position a and the position b in FIG. 6 under the condition that the load mass is supported by the movable shaft 31, the vibration damping apparatus 10 is fixed on a table of a vibrator using mounting bolts 61 of the casing 20, then the vibration is applied, and the vibration transfer ratio of the load mass against the frequency is measured. In addition, for comparison, the vibration transfer ratio is measured for "a liquid-sealed engine mount" with a predetermined amount of the load mass. The liquid-sealed engine mount is a damping device which seals a liquid in a rubber mount used in an engine mount in the prior art. In FIG. 12, the expressions "0.5 mm" and "1.0 mm" indicate the amount of the amplitude. Since the mesh of the net 351 composing the piston 35 is hardly collapsed in this range, it does not serve as an orifice, and has no damping function as a dash pot system exhibited by pressing the viscous liquid.

As is clear in FIG. 12, according to the vibration damping apparatus in the test example, the vibration transfer ratio is far low in all frequency ranges compared with that of the liquid-sealed engine mount as a comparison example. Especially in the test example, the resonance peak is shifted to a low frequency area compared with the comparison example, and the vibration in a wide range from 3 Hz through a high frequency area, to which the human body is sharply sensitive, is damped.

A vibration damping apparatus using a magnetic circuit according to the present invention is not limited to the case that the magnetic spring device is constructed by using permanent magnets for both of the movable magnet and the stationary magnet as described above, but it is possible to use a magnetic circuit formed with a ferromagnetic material such as iron and the like or a non-magnetic material such as copper and the like in place of the movable magnet 37, and a stationary magnet disposed in a manner to hold the ferromagnetic material or the non-magnetic material therebetween in the structure of the second embodiment shown in FIG. 7.

When the magnetic circuit is formed with a stationary magnet and a ferromagnetic material such as iron and the like, since the ferromagnetic material is magnetized due to the magnetic induction effect depending upon their relative displacement, a damping force to control the movement of the movable magnet 30 is generated. When the magnetic circuit is formed with a stationary magnet and a non-magnetic material such as copper and the like, since an eddy-current is excited in the non-magnetic material due to the electromagnetic induction effect accompanied by their relative displacement, a resistance force is generated in a direction to disturb their relative movement which results in a damping force.

By the damping force created by the magnetic induction effect or the electromagnetic induction effect, it is possible to absorb particularly the vibration effectively, which exists before the above-described viscous resistance due to the viscous liquid starts to work.

When a vibration damping apparatus according to each embodiment is assembled, for instance, a process to dispose the stationary magnet 27 in the casing 20 shown in FIG. 1 requires time-consuming jobs. In addition, the mounting operation of these respective magnets, and the filling operation of the viscous liquid or the setting operation of the metal spring or other members are often operated in a factory (facility) different from the assembling factory. For instance, there may be a case that only a mounting operation of each magnet to the casing and the movable members respectively is performed in a factory, and other setting operations are performed in other factories (facilities). However, in this case, if the casing fixed with the stationary magnet and the movable member fixed with the movable magnet are shipped separately to another factory, an operation to assort these members is required in that factory at the destination.

Figure 13:
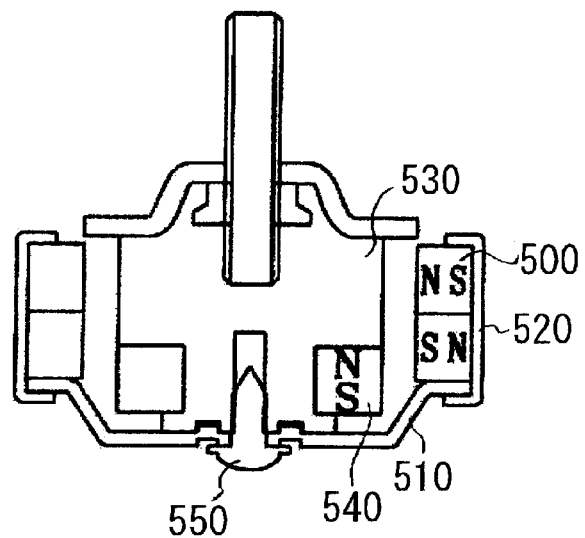
FIG. 13($a$) is a view showing a subassembly state of the cylinder holding the stationary magnet and the movable member holding the movable magnet, and FIG. 13($b$) is a view showing the vibration damping apparatus of the present invention obtained after removing screws from the subassembly.
Figure 13:
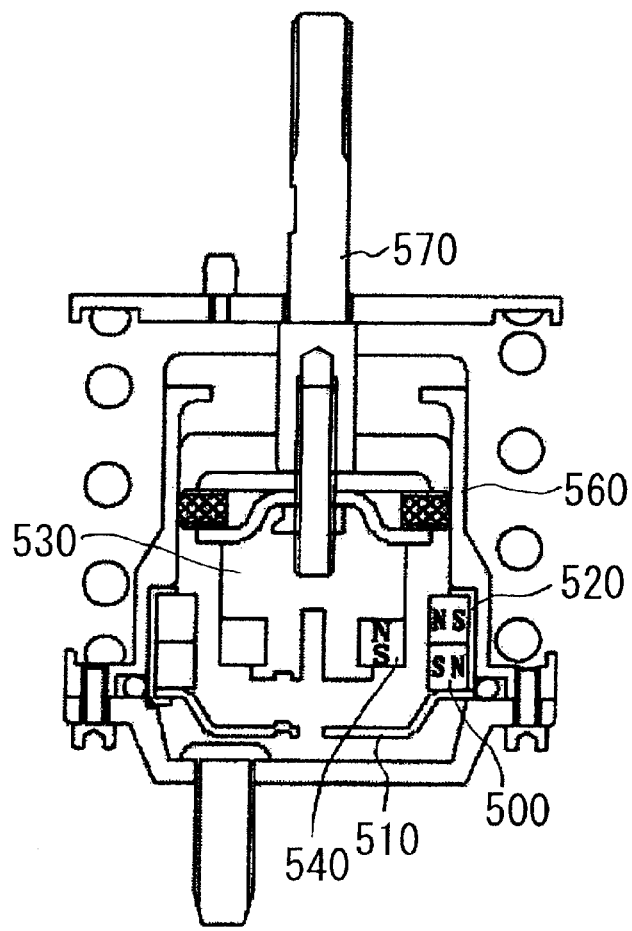

Therefore, as shown in FIG. 13(a), a stationary magnet 500 is fixed on a bottom wall 510, and a cylinder 520 to be a yoke is disposed therearound. At the same time, a movable magnet 540 is also fixed on a movable member 530, and then the bottom wall 510 and the movable member 530 are integrated with screws 550, so that this integrated state can be a subassembly state as a preferable structure for the shipment. With such a structure like this, as shown in FIG. 13(b), the vibration damping apparatus according to the present invention can be easily assembled in another factory (facility) at the destination by only removing the screws 550, disposing the cylinder member 520 holding the stationary magnet 500 in a casing 560, connecting a movable shaft 570 to the movable member 530 and so on.

With a vibration damping apparatus using a magnetic circuit according to the present invention, vibration transfer can be isolated by a vibration damping mechanism to make the spring constant utilizing a relative displacement of the movable magnet and the stationary magnet in an axial direction, and an elastic force of the metal spring substantially zero. Furthermore, by pressing the viscous liquid with the piston, a viscous damping function can be performed when a large vibration is inputted, thereby preventing from contacting with the bottom members. As a result, the viscous damping function can be performed without providing a shock absorbing device separately, and a small size vibration damping apparatus with a simple structure can be provided. In addition, since the piston is structured not to create the liquid resistance unless the relative displacement of the movable member and the casing becomes more than a predetermined value, the damping mechanism by the above-described magnetic spring device for an input vibration having magnitude less than a predetermined value can not be disturbed. Incidentally, by structuring the piston to use a net having a predetermined thickness, a device can be produced with a simple structure, which allows no viscous damping function to work until the relative displacement of the movable member to the casing reaches more than a predetermined value.

Besides, when a ferromagnetic material such as iron and the like or a non-magnetic material such as copper and the like is used in place of the movable magnet, it is also possible to use a magnetic circuit composed of such a material and the stationary magnet. In this case, by the damping force created by the magnetic induction effect or the electromagnetic induction effect, it is possible to absorb particularly the vibration effectively which exists before the viscous resistance due to the viscous liquid starts to work.

Still further, since by making the structure to be provided with a restoration device, the displacement due to vibration not only in an axial direction (Z axis direction) but also in a horizontal direction (X or Y axis direction), in a rotational direction around each axis, or in a twisting direction which is an overlapping direction of these directions can be restored quickly to an original position by the restoration device and can be damped as a vibration in an axial direction, the vibration damping apparatus of the present invention can control vibration having 6 degrees of freedom with a simple structure.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A vibration damping apparatus using a magnetic circuit, comprising:
   a movable member disposed relatively movable along an axial direction in respect to a casing;
   a movable magnet fixed on said movable member;
   a stationary magnet fixedly disposed in said casing, and forming a magnetic field to have a negative spring constant in a predetermined range of the displacement amount in the axial direction of said movable member with said movable magnet;
   an elastic member to force said movable member in a direction to keep a distance away from the bottom wall of said casing, and to set a spring constant obtained by combining a magnetic force of a magnetic field formed by said movable magnet and said stationary magnet and an elastic force, to be substantially zero in a predetermined range of the displacement amount in the axial direction; and a piston which moves by being pressed with said movable member and presses a viscous liquid filled in said casing to create fluid resistance when the displacement amount of said movable member in the axial direction reaches a predetermined value.

2. The vibration damping apparatus using a magnetic circuit according to claim 1, further comprising a restoration device to restore said movable member to the original position from the displacement position in other directions including the rotational directions other than the axial direction.

3. The vibration damping apparatus using a magnetic circuit according to claim 1, wherein said piston comprises a ring shaped net of a predetermined thickness, in which the outer peripheral face has an outside diameter possible to come in slidable contact with the inner peripheral face of the casing, and a circular shaped plate layered on the top and bottom faces of the net, and wherein the net is deformed to make the mesh smaller by a fluid pressure received by any circular shaped plate, when the movable member moves more than the predetermined amount in the axial direction in respect to the casing, and the mesh functions as an orifice to create fluid resistance.

4. The vibration damping apparatus using a magnetic circuit according to claim 3, wherein said net comprises a front mesh layer and a back mesh layer disposed at a predetermined distance, and has a three dimensional structure made by connecting each mesh layer to each other in a manner that a large number of piles are arranged in the opposing direction between the front mesh layer and the back mesh layer.

5. The vibration damping apparatus using a magnetic circuit according to claim 2, wherein said restoration device comprises a linkage member abutting on the circumference of said movable member and displacing its position according to the displacement of the movable member in said other directions, and a rubber member disposed between the linkage member and said casing to allow the movable member to restore to the original position by an elastic restoring force.

6. The vibration damping apparatus using a magnetic circuit according to claim 1, wherein said elastic member comprises a metal spring.

7. The vibration damping apparatus using a magnetic circuit according to claim 1, further comprising a ring shaped seal member connected to a movable cover fixed around a movable shaft composing said movable member, being able to support the movable cover at a predetermined distance from any of the members composing the casing, and having a function of limiting the movable range of said movable member in a downward direction by abutting on any of the members composing the casing, and a function to prevent leakage of the viscous liquid filled in the casing simultaneously.

* * * * *